United States Patent Office 3,145,183
Patented Aug. 18, 1964

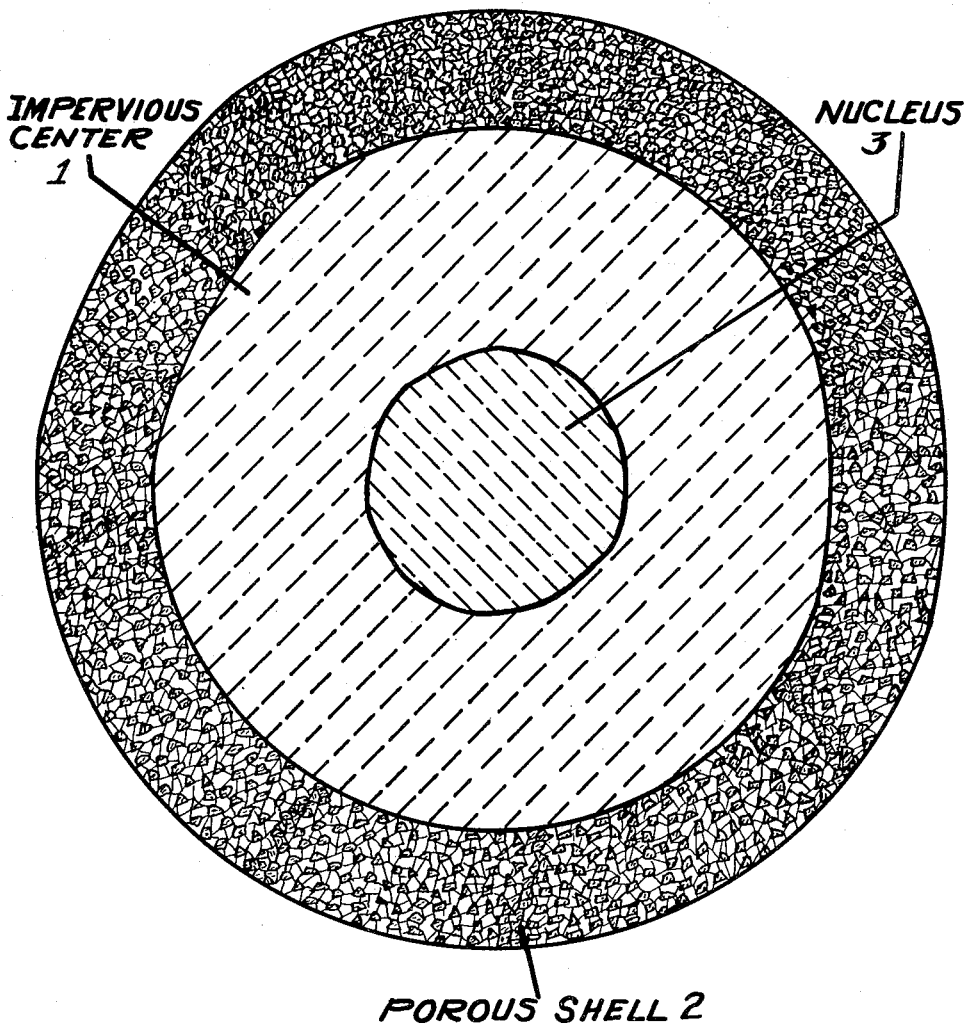

3,145,183
CATALYST CARRYING BALLS
Henry C. Fisher, Worcester, Mass., assignor to Norton Company, Worcester, Mass., a corporation of Massachusetts
Filed Dec. 16, 1958, Ser. No. 780,853
7 Claims. (Cl. 252—477)

The invention relates to catalyst carrying balls and method of producing them. This application is a continuation-in-part of my copending application Serial No. 526,344, filed August 4, 1955, now abandoned.

One object of the invention is to provide a ball which is economical of platinum catalysts and other expensive catalysts. Another object of the invention is to provide such a ball which can be readily manufactured by inexpensive procedure. Another object of the invention is to provide such a ball which is resistant to thermal shock. Another object is to produce different lots of balls of equal catalytic characteristics but differing in densities to suit use requirements. Another object is to vary the depth of the catalytic layer and its chemical and activity characteristics independent of ball size. Another object is to produce a ball that confines the catalytic action to a surface layer of known depth having known pore size, known permeability and known surface area characteristics. Another object is to produce balls of roughly spherical shape having a zoned structure comprising a plurality of layers each of roughly spherical shape on their external surface.

Other objects will be in part obvious or in part pointed out hereinafter.

The accompanying drawing is a cross sectional view on a greatly enlarged scale of one ball adapted for catalyst carrying purposes according to the invention. This drawing is illustrative and conventional as it is practically impossible to draw a true cross section of such an article. Other balls varying in relative dimensions, plurality of zones and other features can be made as will be later described.

Balls according to the invention have a heat-resistant impervious center 1 and a porous shell 2, the center 1 and the shell 2 being integral with each other. The outside porous shell is usually made of ceramic material and the impervious center is usually also made of ceramic material. When a permanent nucleus is present in the final product, it too is also usually ceramic material. However, other materials can be used as will be described later.

Insomuch as probably no solids are completely impervious, it will suffice if the center 1 is substantially impervious. By substantially impervious I mean that ink put on the surface does not disappear into the structure in a few moments and, with fine pores, another impermeability test is to immerse the product at room temperature in a dye solution, such as 1 gm. of Basic Fuchsin dye dissolved in 1 liter of water, for 5 minutes, then withdraw it, and wash it off in room temperature tap water for 2 or 3 minutes and then break it for examination. A signficant amount of penetration of the dye color below the surface of the center zone should not occur.

Another type of test to measure imperviousness is to determine the amount of water absorbed under a standard set of conditions. In this test the outer shells are removed from enough balls to give around 40 grams of the impervious centers. These are weighed exactly, then placed in actively boiling water for 30 minutes, removed, dried by rubbing with a very slightly damp cloth, and immediately reweighed. A typical weight of impervious centers should check the original weight within about 1%. In the case of small balls an additional allowance may have to be made for experimental errors associated with the operator's ability to dry the surfaces of the small ceramic pieces adequately.

These tests for impermeability mean that the surface of the center zone is substantially free from anastomosing pores and the catalytic material cannot permeate significantly thereinto but will remain in the shell 2. Anastomosing pores in accordance with the dictionary definition are interconnecting pores.

In catalytic reactions in which a catalyst carrier having a porous structure extending to its center is used, the catalyst applied to it by impregnation will line the walls of the pores throughout the entire material, but the catalytic activity occurs mainly in the fine pores at or near the exterior surface of the porous carrier. Catalyst deep within the carrier performs only a minor role since reacting materials have to diffuse through pores nearer the exterior to reach this interior catalyst and in so doing react in the presence of catalyst located nearer the exterior of the carrying material. This being so, the catalyst located in the innermost region of the support does not influence the chemical reaction to any marked extent and is therefore largely wasted material. I have found that the amount and cost of catalyst can be substantially decreased by using an approximately spherical support consisting of an impervious center 1 which is devoid of catalyst enclosed within an anastomosingly porous shell 2 in which the catalytically active material is impregnated.

The average diameter of the porous shell 2, meaning the outside diameter of course, should often be at least 10% greater than that of the impervious center for efficient catalyzing of the processes involved. However, very thin porous shells such as about 1 or 2 mils thickness, approaching the thickness of a single layer of fine particulate material may be employed with certain types of catalytic reactions which take place with expensive catalysts or those acting most efficiently in thin surface layers. In other cases, layers such as 1/8" or 1/4" or even thicker may be used and these may contain larger induced pores to give the gases easy access to the interior, along with finer natural pores having walls that constitute the desired active surfaces. Nuclei that are too small are difficult to use as "starters" for the rolling process particularly when they are of light weight and have smooth surfaces. Under such circumstances, such as with starters of natural vegetable seeds, 1/8" diameter is advantageous for the nuclear diameter, whereas with heavy rough-surfaced abrasive or refractory grains, approximately 1/24 or 1/30 of an inch average diameter may be employed satisfactorily.

The finished balls will be made to different diameters depending on use requirements. A common range is from 1/8" to 1 1/2" outside diameter. Balls smaller than 1/8" are difficult to control in size but some can be made when size uniformity is not important. Large balls are heavy and tend to deform out-of-round in the rolling process.

The anastomosing porosity of the shell 2 should usually be at least 10% by volume in order to carry sufficient catalyst and usually not greater than about 85% by volume in order that the balls shall have adequate strength. In addition to this anastomosing porosity, some sealed pores may be present.

To aid in interpreting the examples, an illustrative outline of products is given in Table I.

TABLE I.—ILLUSTRATIVE OUTLINE OF PRODUCTS

A. Original nucleus in manufacture:
  (May or may not have permeability.)
  (May or may not constitute the impervious center zone.)

Constituents

A1. Ceramic material remains in product and consists of fragment or bead, etc. of—
  (a) Crystalline material
  (b) Glass
A2. Organic material ordinarily does not remain in product.
  (a) Natural material in granular or seed form.
  (b) Synthetic fragment or bead, etc.
A3. Metallic material fragment or bead, etc, remains in product.

B. Final product outer shell:

(Has anastomosing pores conferring permeability.)
(May or may not have closed pores.)
(May or may not have induced pores.)
Under particular use conditions must be—
  Adequately strong
  Adequately heat-resistant
  Adequately thermal shock resistant
  Adequately stable
  Adequately pure and non-poisonous for desired catalytic reaction

Constituents

B1. Ceramic material—
  (a) Particulate oxides applied by the rolling "snow-balling" process, including mixtures, sintered or bonded: $Al_2O_3$, MgO, $ZrO_2$, $HfO_2$, $SiO_2$, BeO, $Cr_2O_3$, $ThO_2$, CaO, $TiO_2$, etc.
  (b) Particulate SiC, $B_4C$, etc., rolled on in mixture with added bond.
  (c) Particulate material applied by rolling process and reacted in place to form final constituent: for example, Si reacted to form silicon nitride.
B2. Metallic material—Particulate metals or alloys applied by snow-balling process, such as Al, Fe, Ni, Co, Cr, steel, brass, bronze, etc., matured into strong, heat-resistant, thermal-shock resistant, stable condition by well-known metallurgical sintering techniques.

C. Final product impervious center:
(May or may not be constituted by the nucleus.)
(May or may not be fabricated in the snow-balling rolling process.) General range of constituents is similar to final product outer shell but, if processed, the center zone must be impermeable or have no anastomosing pores in the outer layer next to the permeable shell.

To conserve space, the following typical materials and procedures illustrative of those embraced by Table I are given in summary form:

A. NUCLEUS

A1(a). Abrasive grains, refractory grains, shapes molded from powders and from granules, crushed scrap such as oxide ceramics, ceramics such as alumina or zirconia in bubble form, etc.

A1(b). Glass marbles or beads or bubbles, fragments of fused quartz or glass, etc. (preferably with roughened or milled surfaces).

A2(a). Crushed nut shells, coke, etc.; peas, rape seed, bayberry seeds, tapioca, etc. (may be used "as is," after heating to drive off volatiles, after wax impregnation to avoid swelling from water in the mix, etc.).

A2(b). Synthetic fragments, beads, bubbles, etc. of materials such as various plastics, resins, etc.

A3. Shot or fragments of metals or alloys such as Al, Fe, Cu, Ni, Co, Cr, brass, bronze, etc.

B. OUTER SHELL

B1(a). Pure oxides in fine particulate form can be sintered at high temperatures to form hard structures, or more-refractory oxides can be bonded by other less-refractory oxide mixtures by firing at lower temperatures. Bonding ingredients can include mined natural products such as clays, clay-like materials, feldspars, talc, wollastonite, petalite, spodumene, etc., and also synthetic oxide mixtures or glass frits composed of such oxides as $Na_2O$, $K_2O$, $Li_2O$, CaO, MgO, SrO, BaO, $Al_2O_3$, $TiO_2$, $SiO_2$, $ZrO_2$, $B_2O_3$, $P_2O_5$, etc.

B1(b). Bonding ingredients are such as listed under B1(a) except that principles of bonding in the published ceramic literature have to be applied with more care than with oxides in order to avoid deleterious reaction and swelling during firing with constituents being bonded, and in some cases non-oxidizing atmospheres should be used.

Several examples will now be given to illustrate the practice of my invention.

Example I

The following is a summary of materials used and manufacturing detail:

NUCLEUS

24 grit size white fused alumina, 99+% $Al_2O_3$.

IMPERVIOUS CENTER

| | Pounds |
|---|---|
| Calcined alumina finer than 325 mesh | 95 |
| Ground ball clay finer than 200 mesh | 5 |
| Dextrin finer than 100 mesh | 1 |

INTERMEDIATE ADHESIVE MIXTURE

| | Parts by wt. |
|---|---|
| "Alkaphos C" | 50 |
| Water | 50 |

POROUS SHELL

| | Pounds |
|---|---|
| White fused alumina 90F sizing, of which about 75% was coarser than 200 mesh | 80 |
| Ground ball clay finer than 200 mesh | 20 |
| Dextrin finer than 100 mesh | 1 |

MANUFACTURING DETAILS

Built up center ball to 0.2 inch diameter.
Fired center ball in rotary kiln at 1725° C., estimated 20 minute soak.
Coated center ball with porous shell material about 1/32" thick, giving about 1/4" diam. ball.
Fired completed ball at 1260° C. for about 2 hours.

I procured a quantity of fused alumina grain, #24 grit size, of the white variety which is more than 99% pure $Al_2O_3$ and is crystalline, having been fused in an electric furnace, solidified into a large "pig," crushed to grain and sized. This material is well known in the abrasive and refractory arts and is derived from Bayer process alumina, also well known, which is a finely divided alumina made by calcining aluminum hydroxide.

I had on hand a steel tumbling barrel consisting of a hollow cylinder mounted on trunnions at right angles to its axis half way along its length. I weighed into this barrel 95 pounds of calcined alumina finer than 325 mesh, 5 pounds of ground ball clay finer than 200 mesh and 1 pound of dextrin powder finer than 100 mesh and rotated the barrel at about 10 r.p.m. for 2 hours to produce an intimate blend which will be referred to as the dry mixture.

I had on hand a rotary container which is roughly a hollow sphere made of brass mounted on an axis inclined at about thirty degrees to the horizontal, having an open end opposite to its mounting at what can be called the upper polar zone, the inside diameter of this container being about four and a half feet. The container was power driven at a speed of about 20 r.p.m. and constituted a machine for coating by the so-called "snow balling" method.

I charged the container with about five pounds of the fused alumina grain which was nucleus material, an individual granule thereof being identified as the nucleus 3 in the drawing. I directed a spray of water at the rate of about 20 cubic centimeters of water a minute at the alumina grain and, when the grain was well wet I started feeding the dry mixture onto the grain at the rate of about 100 grams a minute, still maintaining the spray of water at the same rate. A flame of gas was used to keep the container warm supplying enough heat to prevent the evaporation of water from lowering the temperature below that of the room and actually raising it a few degrees Fahrenheit which, depending on the weather, would be roughly 90° F.

The dry mixture adhered to the grain forming individual built up balls. This process was continued until these balls had attained a diameter of about 0.20 inch. These balls were then dried in an oven to eliminate all but a fraction of a percent of the water. The oven was at about 200° F. and the balls were in it over night in a typical example, for I made more than one lot of the balls and non-critical features such as this varied.

The dried balls were then fired in a rotary furnace having a refractory lining to a temperature of about 1725° C. It required approximately one hour for each ball to pass through the rotary furnace and I estimate that each ball was at the top temperature close to 1725° C. for about twenty minutes, but in any process such as this one there are inevitably variations from ball to ball. However the above directons are adequate for the manufacture of good centers in accordance with the invention. This completed the manufacture of the impervious center 1 with the nucleus 3 in a quantity of many units.

I then took 15 pounds of the fired impervious centers 1, put it into the same rotary container heated and rotated as before, and wet it with 100 cubic centimeters of 50 parts by weight water and 50 parts by weight of Alkaphos C. The latter is a water solution of mono-aluminum orthophosphate put out by Monsanto Chemical Co., but any adhesive material can be used, inorganic adhesives being preferred.

I had on hand a second mixture of the white fused alumina of 90 grit size, and finer, 80 parts by weight and 20 parts by weight of the same ground ball clay and 1 part of dextrine. I added the second mixture to the 15 pounds of fired centers while the rotary container was still rotating, adding the second mixture slowly, that is dusting it in over a period of about two minutes.

Attention should be called to the fact that the main constituent of the impervious center mixture was calcined alumina of extremely fine sizing through 325 mesh, the particles of which are very fine being about all finer than 25 microns, with an average diameter of about 11 microns. This fine material in the mixture that was used sinters at 1725° C. to an impervious condition. The main constituent of the porous shell is less-reactive fused alumina of 90F sizing which is much coarser and in the mixture used fired to the lower temperature of 1260° C. matures to a hard but porous structure.

In this manner I evenly coated the fired centers with the second mixture. Instead of making time the guide for this step in the manufacture of the balls, it is better to wait until the balls are evenly coated. I then turned on the water, directed at the material in the container as a spray, and continued dusting in the second mixture. This procedure caused the coatings on the fired centers to increase and I continued spraying water and dusting in the second mixture until I had built up the balls to an overall diameter of about one-quarter of an inch which involved a wall thickness of the coating on the centers of about one thirty-second of an inch as the total amount of the second mixture fed into the container was about 20 pounds. Estimates of water added in this and in the preceding part of the process are only approximate as I examined samples of the balls from time to time and the object is to keep them moist, but I would say that the total amount of water added in building up the eventually porous shell 2 was about 1.5 pounds.

I then dried the outer coatings of the balls in the same manner that I dried the coatings which formed the impervious center 1. I then fired the balls, now consisting of impervious centers 1 with coatings of the second mixture therein, in an electric furnace to 1260° C. holding them at that temperature for a period of about 2 hours. The firing cycle involved a rise of temperature ond mixture thereon, in an electric furnace to 1260° C. per hour, and a drop in temperature from 1260° C. at the rate of about 50° C. per hour. This completed the manufacture of the balls and the outer coatings had become porous shells 2.

*Example II*

NUCLEUS

30 grit size white fused alumina, 99+% Al$_2$O$_3$.

IMPERVIOUS CENTER

| | Pounds |
|---|---|
| Calcined alumina finer than 325 mesh | 42 |
| Tabular alumina finer than 325 mesh | 42 |
| Ground ball clay finer than 200 mesh | 6 |
| Talc finer than 200 mesh | 7½ |
| Wollastonite finer than 200 mesh | 2½ |
| Dextrin finer than 100 mesh | 4 |

POROUS SHELL

| | |
|---|---|
| Calcined alumina approx. 95% through 100 on 325 mesh | 92½ |
| Ground feldspar finer than 200 mesh | 7½ |
| Dextrin finer than 100 mesh | 4½ |
| Carboxy methylcellulose finer than 100 mesh | ½ |

MANUFACTURING DETAILS

Built up impervious centers to 3/16″ diameter, then built up porous shell to thickness of 1/16″. Fired entire sphere at 1450° C. for 2 hours. Water absorption of impervious center about 0%. Anastomosing porosity by water absorption test=about 35%.

This example was made similarly to Example I, according to the details described above. No intermediate adhesive mixture was used. In addition to formula differences, it will be noted that both the impervious center and the porous shell were put on before firing, and then the entire ball was fired to a temperature that matured the center to imperviousness and the shell to a porous structure. Calcined alumina was a constituent of both the impervious center and the porous shell but the sizing was very much finer for the impervious center calcined alumina and also for the tabular alumina used with it. In addition, the different active fluxes in the center mix as well as the much finer alumina sizing contributed to its maturing to an impervious condition as compared to the porous matured condition of the outside shell.

*Example III*

NUCLEUS

30 grit size white fused alumina, 99+% Al$_2$O$_3$.

IMPERVIOUS CENTERS (Same as Example II)

| | Pounds |
|---|---|
| Calcined alumina finer than 325 mesh | 42 |
| Tabular alumina finer than 325 mesh | 42 |
| Ground ball clay finer than 200 mesh | 6 |
| Talc finer than 200 mesh | 7½ |
| Wollastonite finer than 200 mesh | 2½ |
| Dextrin finer than 100 mesh | 4 |

POROUS SHELL

| | |
|---|---|
| White fused alumina, straight #90 grit size | 92 |
| Ground feldspar finer than 200 mesh | 8 |
| Dextrin finer than 100 mesh | 2 |
| Carboxy methylcellulose finer than 100 mesh | 1 |

MANUFACTURING DETAILS

Built up centers to 3/16" diameter.
Then built up porous shell to thickness of 1/16 inch.
Fired entire ball at 1450° C. for 2 hours.
Water absorption of impervious center about 0%.
Anastomosing porosity by water absorption test=about 40%.

This Example III was approximately the same as Example II except that white fused alumina of straight #90 grit size, which is through 90 mesh on 100 mesh screen, was used for the porous shell composition. This will give much larger size anastomosing pores. Visual examination of these balls shows them to have a much coarser surface texture than the balls of Example II.

*Example IV*

NUCLEUS

30 grit size white fused alumina, 99+% Al$_2$O$_3$.

IMPERVIOUS CENTER (Same as Example II)

| | Pounds |
|---|---|
| Calcined alumina finer than 325 mesh | 42 |
| Tabular alumina finer than 325 mesh | 42 |
| Ground ball clay finer than 200 mesh | 6 |
| Talc finer than 200 mesh | 7½ |
| Wollastonite finer than 200 mesh | 2½ |
| Dextrin finer than 100 mesh | 4 |

POROUS SHELL

| | |
|---|---|
| Zircon, approx. straight #100 grit size | 95 |
| Ground ball clay finer than 200 mesh | 3 |
| Ground bentonite finer than 200 mesh | 2 |
| Dextrin finer than 100 mesh | 2 |
| Carboxy methylcellulose finer than 100 mesh | 1 |

MANUFACTURING DETAILS

Built up centers to 3/16" diameter.
Then built up porous shell to 1/16" thickness.
Fired entire ball at 1450° C. for 2 hours.
Water absorption of impervious center about 0%.
Anastomosing porosity of shell by water absorption test about 30%.

This example is similar to Example III except that the porous shell is composed of zircon which is zirconium silicate, a crystalline mineral. The balls looked like Example III. They were hard and no difficulty was indicated due to the lower expansivity of zircon compared to alumina.

*Example V*

NUCLEUS

24 grit size white fused alumina.

IMPERVIOUS CENTER

| | Pounds |
|---|---|
| Calcined alumina finer than 325 mesh | 84 |
| Ground kaolin finer than 200 mesh | 6 |
| Talc finer than 200 mesh | 7½ |
| Wollastonite finer than 200 mesh | 2½ |
| Dextrin finer than 100 mesh | 4 |

INTERMEDIATE ADHESIVE MIXTURE

| | Parts by wt. |
|---|---|
| "Alkaphos C" | 50 |
| Water | 50 |

POROUS SHELL

| | |
|---|---|
| Silicon carbide 100 mesh and finer | 75 |
| Ground ball clay finer than 200 mesh | 25 |

Manufacture of this example was carried out in the same general manner as Example I with details as given above. The impervious shell was fired at 1450° C. for 2 hours, an intermediate adhesive mixture was used, the porous shell was composed primarily of silicon carbide grain and the final firing of the completed balls was at 1250° C. in an oxidizing atmosphere.

*Example VI*

NUCLEUS

24 grit size fused alumina.

POROUS CERAMIC ZONE

| | Pounds |
|---|---|
| White fused alumina 90F sizing of which about 75% was coarser than 200 mesh | 44 |
| Calcined alumina finer than 325 mesh | 44 |
| Ground ball clay finer than 200 mesh | 12 |
| Dextrin finer than 100 mesh | 3 |
| Carboxy methylcellulose finer than 100 mesh | 1 |

POROUS NICKEL ZONE APPLIED AS NICKEL OXIDE SLURRY FOR 5 LB. LOT OF BALLS

| | | |
|---|---|---|
| Calcined nickel oxide finer than 325 mesh | grams | 300 |
| Carboxy methylcellulose finer than 100 mesh | do | 3 |
| Water | cc | 1000 |

MANUFACTURING DETAILS

Built up porous ceramic zone to 3/16" diameter.
Fired center ball at 1450° C. for 2 hours.
Built up on center ball using nickel oxide mixture to a layer thickness of around 1/32".
Fired the balls in air at 800° C. for ½ hour.
Refired the balls in hydrogen at 900° C. for 1 hour, thereby reducing the nickel oxide to metallic nickel.

The final balls produced had a good appearance and were mechanically strong. They represent a special type of product with both porous ceramic and porous metal constituting outside shells.

*Example VII*

This example illustrates the manufacture of a lightweight ball with a void at the center. It is made in the same way as Examples II and III except that the nucleus is an organic seed material and rape seed for smaller voids or dried peas for larger voids can be used depending on the size of the void desired in the product. The firing is carried out on a slow oxidizing schedule to burn out the organic seed material before the center ceramic zone is matured to imperviousness.

*Example VIII*

This example is similar to Example VII except that a heavy-weight ball is made by using a heavy material like a fused lime-stabilized zirconia grain of density about 5.6 grams/cc. as the nucleus at the center.

*Example IX*

This example illustrates the manufacture of a ball in which the final porous shell is composed of a thin layer of fine silicon nitride developed in situ by chemical reaction between fine silicon and nitrogen gas. In this case the impervious center is also the nucleus and is a mulled silicon carbide grain of #10 grit size.

Starting with #10 grit size silicon carbide grain which is mulled to make it equidimensional, it is rolled in the container with elementary silicon grain of 325 grit size and finer using an aqueous solution of dextrin and bentonite clay as wetting and binding agent. After building up the silicon carbide nuclei with a silicon coating 1/64 inch thick, the balls are dried and then fired in a nitrogen atmosphere at 1380° C. for two hours. Balls made by this process have impervious silicon carbide centers and porous outer shells of silicon nitride.

*Example X*

This example illustrates the use of a metallic nucleus with a metallic porous shell. The nucleus is nickel shot of diameter about 1/16" to about 1/8" depending upon the product desired. This is roughened on the surface by abrasive blasting to promote adhesion of the porous shell.

It is then rolled in the rotating barrel with a mixture feed consisting of about 96% of carbonyl nickel powder and about 4% of powdered "Methocel," which is a trade name for methylcellulose. Water is sprayed into the barrel during the coating operation. The barrel can be steam jacketed, if desired. After drying the product, the methylcellulose is volatilized and burned by a low temperature oxidizing fire at around 250° C., followed by replacement of the air with nitrogen and then with hydrogen atmosphere, completing the sintering at about 1000° C. for several hours. This produces a spherical shell which may contain as much as around 85% anastomosing pores. Fine nickel fibers of short length in the final coating mixture, can be used to aid in the attainment of high percentages of anastomosing pores.

To demonstrate anastomosing pore sizes of the porous shells of some of my products, I broke away the shells from the impervious centers by hitting balls individually with a steel hammer after placing them on a steel anvil. A sharp blow is required to cause the porous shell to break substantially away from the impervious center. About 0.6 gram of porous shell pieces constituted a test sample from several representative balls of each lot. These samples were measured for anastomosing pore size using the mercury penetration method as employed in standard catalyst support practice. Results obtained are given in the following Table II.

TABLE II.—ANASTOMOSING PORE SIZE IN POROUS SHELLS FROM CATALYST CARRIERS

| Example No. | 50% of Anastomosing Pore Volume is Smaller and 50% is Larger than the Following Micron Diameters |
|---|---|
| | Microns |
| II | 1.5 |
| III | 35 |
| IV | 25 |

Data of this kind are very helpful in practical use of my carriers and demonstrate one characteristic of the shell that can be varied by choosing different size particles in the mixture used for the porous shell zone of the balls.

The presence of a nucleus in my product is not only a manufacturing advantage but permits the making of balls of different densities to suit different use requirements and yet to control the catalytic activity and catalytic characteristics independent of the density. Thus balls of the same size, material, porosity and catalytic characteristics can be made of widely different densities by using nuclei ranging from voids in the product (nucleus density 0.0) to heavy oxides such as stabilized zirconia (density about 5.6) or nickel metal (density 8.9) or thoria (density about 10.0 grams per cc.). Light weight balls can be advantageous in moving beds to reduce or avoid severe impact and attrition stresses that fracture or wear away the balls, and tend to reduce their service life. Heavy weight balls are advantageous for maintaining their position in fixed catalyst beds against high differential gas pressures and high gas flow rates.

In the use of my carriers it is sometimes advantageous to permit the gases to penetrate readily with little resistance throughout the porous layer of the balls and still have fine-pored material present for actual catalyst retention. Under these conditions I employ well-known ceramic techniques to introduce "induced" pores of larger size into the porous zone. This is accomplished by adding burn-out or readily volatilizable material to the shell zone mixture. For example, I may use materials like sawdust, nut shells, coke, etc. or paradichlorbenzene, naphthalene, etc., in particulate form representing the desired induced pore size, in amounts to give, for example, from 5 to 30 volume percent of induced pores in the porous shell.

The provision of the nuclei 3 is in part a manufacturing expedient. I do not know any way to make balls out of finely divided ceramic material by the snow balling method without starting with nuclei. However, the use of nuclei not only permits the snow balling procedure to be used but introduces desirable structural characteristics previously described and also shortens the manufacturing time required. Putting this in another way more manufacturing time will be required if the nuclei are small than if they are large.

Fused alumina grain is readily available and is one satisfactory material to use for nuclei. The nuclei should be reasonably equidimensional. But many other materials could be used, such as other refractory oxides of which there are many, and non-oxide materials such as silicon carbide can be used if the nuclei are small enough or if the firing conditions are low enough so that deleterious chemical reactions will not take place. Metal fragments and fabricated nuclei can be used with similar choice of conditions. Especially I can use organic materials such as rape seed which will simply disappear during the firing leaving a void in the center of each ball. In its most important aspects, therefore, the invention involves a porous shell upon an impervious center whether the center is a nucleus of refractory material, or whether the impervious center zone is continuous homogeneous material built up upon a nucleus which may or may not be permeable. The impervious center may even constitute a thin impervious layer on the outside surface of an otherwise permeable interior zone in the ball. Although it is more expensive under present conditions, the centers 1 could be molded or compacted from particulate material in another operation, and in such case could then themselves constitute the nuclei.

Although water is the cheapest and most convenient liquid to use in the snow balling operation, other liquids such as non-aqueous solvents may be used under special circumstances. For example, one lot of experimental balls was made with a mixture of "Karo" corn syrup and denatured alcohol.

It will thus be seen that there has been provided by this invention catalyst carrying balls and method of producing them in accordance with which the various objects hereinabove set forth together with many thoroughly practical advantages are successfully achieved. As many possible embodiments may be made of the above invention and as many changes might be made in the embodiments above set forth, it is to be understood that all matter hereinbefore set forth or shown in the accompanying drawing is to be interpreted as illustrative and not in a limiting sense.

I claim:

1. A roughly spherical ball adapted for catalytic carrier purposes comprising an adequately strong, heat-resistant, thermal shock-resistant, stable impermeable center zone of substantially equidimensional shape composed of a ceramic material having a major constituent selected from the group consisting of alumina, magnesia, zirconia, silica, chromia, titania and silicon carbide, said center zone being totally enclosed by a shell, fired to be integral with and bonded to said center zone, said shell being of roughly spherical external shape comprising an adequately strong, heat-resistant, thermal shock-resistant, stable composition composed of material selected from the group consisting of ceramic and metallic material, having porous structure containing from about 10% to about 85% by volume of anastomosing pores.

2. A ball according to claim 1 in which the porous shell is ceramic material.

3. A ball according to claim 2 in which there is a void within the impervious center.

4. A ball according to claim 1 in which there is a void within the impervious center.

5. A ball according to claim 1 in which the porous shell is metallic material.

6. Method of making catalyst carrying balls comprising providing substantially equidimensional nuclei, charging a rotary container with said nuclei, coincidentally directing into the container while it is rotating a liquid spray and inorganic particulate first material in powdered form until the nuclei have picked up substantial coatings of said particulate material in originally powdered now wet form, said inorganic first material in powdered form being capable of being matured into an impervious condition, then coincidentally directing into the container while it is rotating a liquid spray and inorganic particulate second material in substantially coarser form than said first material until the coatings already on the nuclei are covered with substantial second coatings, both the first and the second coatings being roughly spherical, said inorganic second material being capable of being matured into an anastomosing pore structure with anastomosing porosity of from 10% to 85% by volume, thus forming balls consisting of nuclei and two inorganic coatings of inorganic material in particulate form thereon, removing the balls from the rotary container, drying them and then firing the balls in a single firing operation maturing the first material into an impervious condition and the second material into said anastomosing pore structure and also joining said first and second coatings integrally.

7. Method of making catalyst carrying balls comprising providing substantially equidimensional nuclei, charging a rotary container with said nuclei, coincidentally directing into the container while it is rotating a liquid spray and inorganic particulate first material in powdered form until the nuclei have picked up substantial coatings of said particulate material in originally powdered now wet form, said inorganic first material in powdered form being capable of being matured into an impervious condition, thus forming balls consisting of nuclei with roughly spherical coatings of inorganic material in particulate form thereon, removing the balls from the rotary container, drying them and then firing them to mature the first material into impervious coatings, replacing the balls in a rotary container, coincidentally directing into the container while it is rotating a liquid spray and inorganic particulate second material in substantially coarser form than said first material until the matured impervious coatings are covered with substantial second roughly spherical coatings of the second particulate material, said inorganic particulate second material being capable of being matured into an anastomosing pore structure with anastomosing porosity of from 10% to 85% by volume, removing the balls from the rotary container, drying them and then firing them to mature the second material into said anastomosing pore structure and also joining said first and second coatings integrally.

References Cited in the file of this patent
UNITED STATES PATENTS

| | | |
|---|---|---|
| 2,478,194 | Houdry | Aug. 9, 1949 |
| 2,507,496 | Bond | May 16, 1950 |
| 2,580,429 | Houdry et al. | Jan. 1, 1952 |
| 2,742,437 | Houdry | Apr. 17, 1956 |
| 2,758,039 | Barbour | Aug. 7, 1956 |

UNITED STATES PATENT OFFICE
CERTIFICATE OF CORRECTION

Patent No. 3,145,183                                        August 18, 1964

Henry C. Fisher

It is hereby certified that error appears in the above numbered patent requiring correction and that the said Letters Patent should read as corrected below.

Column 6, line 10, strike out "ond mixture thereon, in an electric furnace to 1260° C." and insert instead -- in the furnace at the rate of approximately 200° C. --.

Signed and sealed this 1st day of December 1964.

(SEAL)
Attest:

ERNEST W. SWIDER                                    EDWARD J. BRENNER
Attesting Officer                                          Commissioner of Patents